July 11, 1950        F. M. GUY        2,515,002
UNIVERSAL JOINT
Filed Oct. 9, 1946
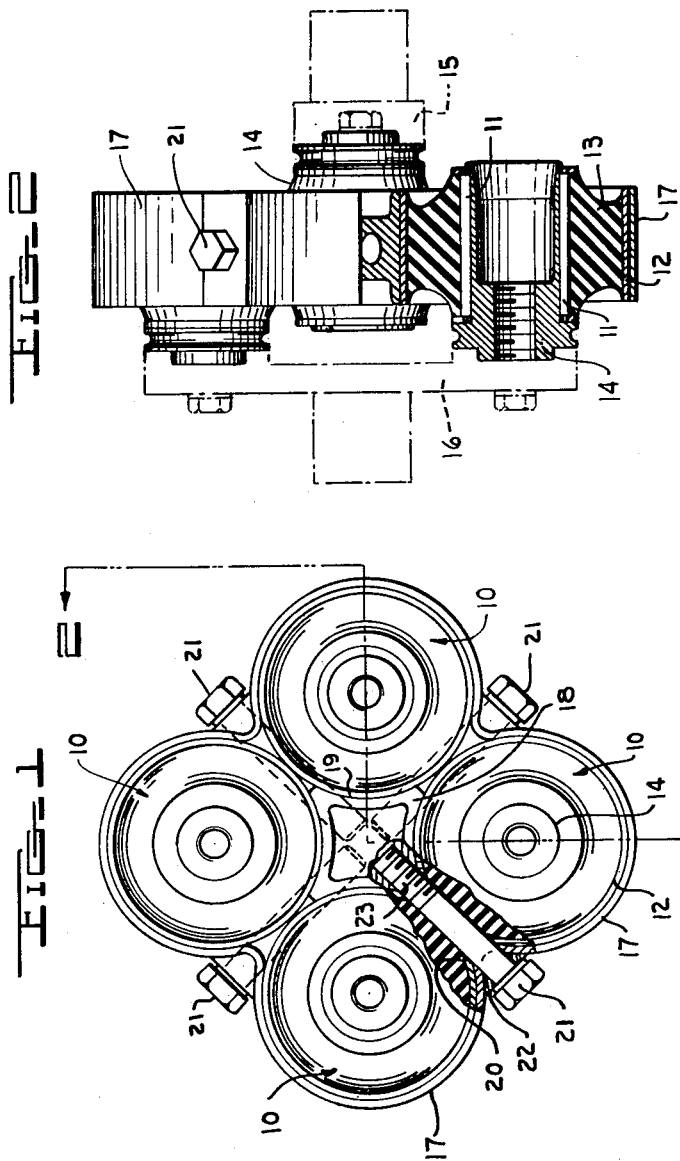
INVENTOR.
FREDERICK M. GUY
BY *Arthur M. Smith*
ATTORNEY Patented July 11, 1950

2,515,002

UNITED STATES PATENT OFFICE 2,515,002

UNIVERSAL JOINT

Frederick M. Guy, Detroit, Mich., assignor to Guy & Murton, Inc., Detroit, Mich., a corporation of Michigan Application October 9, 1946, Serial No. 702,240

13 Claims. (Cl. 64—11)

The present invention relates to a universal joint or flexible coupling and more particularly to such joint or coupling in which resilient elements are interposed between the driving and driven shaft to provide a flexible driving connection.

The present invention is an improvement upon the universal joint construction shown in my issued patents Nos. 1,978,939, dated October 30, 1934, and 2,195,647, dated April 2, 1940.

An object of the present invention is to provide an improved universal joint or flexible coupling in which resilient bushings are interposed between the driving and driven shaft connection to provide for the parallel, angular and longitudinal misalignments of the connected shaft, and to provide a yielding but positive connection between the shafts, and in which irregularities in the transmitted torque loads are cushioned to provide a smooth flow of power through the joint or coupling with a minimum amount of power loss.

It is a further object of the present invention to provide an improved universal joint or flexible coupling in which all metal to metal contacts between the driving and driven shaft connections are eliminated, thus providing a joint or coupling which is quiet in its operation, is not affected by dirt or grit, and which does not require lubrication.

It is a further object of the present invention to provide an improved universal joint or flexible coupling in which all parts are centralized in a unitary carrier to provide a joint or coupling of balanced construction which runs true without friction or backlash during its operation, the design of the carrier and the resilient drive member mounted therein permitting the economical manufacture of the joint or coupling by mass production methods within rather broad tolerance limits.

It is a further object of the present invention to provide an improved universal joint or flexible coupling in which the construction of the carrier permits the ready installation or removal of the joint or coupling between the driving and driven flanges attached respectively to the driving and driven shafts and in which, because of its design and construction, the size and weight of the carrier member is held to a minimum for the load capacity of the joint or coupling.

It is a further object of the present invention to provide an improved universal joint or flexible coupling in which a novel connector is provided to secure a plurality of separate resilient bushings in a unitary central member, so that the resilient bushings are held in predetermined alignment to provide a universal joint or flexible coupling having a relatively high load capacity in respect to its relatively small diameter.

Other objects of this invention will appear in the following description and appended claims, reference being had to the accompanying drawings forming a part of this specification wherein like reference characters designate corresponding parts in the several views.

In the drawings:

Fig. 1 is a plan view partially in section of the central carrier plate and resilient bushings of a universal joint or flexible coupling embodying the present invention.

Fig. 2 is a side elevation, partially in section, substantially on the line 2—2 in the direction of the arrows, Fig. 1, and showing the central carrier connected to driving and driven shaft flanges shown in dotted line.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A universal joint or flexible coupling embodying the present invention comprises a plurality of resilient bushings 10, each of which comprises a core 11 and a circumferential shell 12 to which is secured a body of resilient material 13. A plurality of connecting studs 14 are secured, one each to each core 11, in the plurality of bushings 10.

A driving flange 15 is connected with the studs 14 of one pair of opposed bushings 10 on one face of the coupling and a driven flange 16 is connected with the studs 14 of the other pair of opposed bushings 10 on the face of the coupling opposite the point of connection of the driving flange 15.

The core 11 is preferably of the rigid spaced rod type disclosed in my co-pending application Serial No. 702,241, filed October 9, 1946, now Patent Number 2,505,766 issued May 5, 1940, but may be of any other desired type of construction which will provide a positive non-slipping mechanical connection between the core 11 and the connector studs 14.

The plurality of resilient bushings 10 are held in alignment in the assembly by a circumferentially extending continuous metallic band 17 which is shaped to extend around the circumferential shell portions 12 of the bushings 10 and is folded inwardly to occupy the spaces between the shells of adjacent bushings. A centrally disposed spacer 18 is located at the center of the assembly of the separate bushings 10 and extends between the shell portions thereof at the central portion of the assembly. The spacer 18 is provided with a plurality of arcuate guide surfaces 19 conforming in shape and size to a portion of the circumferential shell 12 of one of the plurality of resilient bushings 10.

The circumferential shell 12 of each of the resilient bushings 10 is drilled as shown at 20 to permit a portion of a locking stud 21 to extend therethrough and lie between two adjacent bushings 10 to thereby hold the bushings 10 against axial displacement relative to the central spacer 18 and the circumferential band 17.

The locking studs 21 each extend radially between the adjacent circumferential shell portions 12 of each pair of resilient bushings 10 and extend through a wedge 22 which has its apex in contact with the folded portion of the circumferential band 17 between an adjacent pair of the resilient bushings 10.

The locking studs 21 each have a screw-threaded end 23 engaging with a screw-threaded opening provided in the spacer member 18. Thus by engaging the screw-threaded end 23 of the studs 21 with the spacer member 18 and by rotating the studs 21 so as to draw the wedge members 22 against the circumferential band 17 and inwardly toward the central member 18, the result will be to tighten the circumferential band 17 on the shell portions 12 of the plurality of resilient bushings 10. Thus it will be seen that the studs 21 not only serve to tighten the band 17 but also act to hold the resilient bushings in place on the central member 18 and prevent their axial displacement relative thereto and relative to the band 17.

From the foregoing it will be seen that the construction herein proposed provides a relatively inexpensive lightweight coupling or universal joint in which a plurality of conventional type resilient bushings are secured to a central spacer member and drawn tightly together in the assembly by means of a circumferential band held in place by a plurality of adjustable stud members. This construction provides a relatively lightweight connector member which is very compact in design and in which the weight and size of the connector element is held to a minimum.

In a preferred embodiment of the present invention, the resilient bushings 10 are molded and then preferably subjected to a swedging or similar operation to reduce the diameter of the outer shell 12. In this manner, the resilient material in the bushings 10 may be pre-loaded as desired to provide the required resistance to movement of the connector studs 14 relative to the shells 12.

It will be apparent from the foregoing that the resilient bushings 10 are mechanically locked against endwise displacement from the carrier assembly, since each of the studs 21 extend through the openings in the shells 12 of adjacent bushings 10. Thus each bushing 10 is held in place by two of the studs 21 which engage the shell 12 at two points spaced 90° from each other. The studs 21 are selected for strengths in excess of the end-thrust loads to which the joint assembly is to be subjected and hence endwise displacement of the bushings 10 does not occur during any intended operation of the joint within its normal load carrying capacity.

I claim:

1. A resilient drive coupling comprising a plurality of separate resilient bushings each including a central core and a spaced circumferential shell joined by a body of resilient material, a central spacer adapted to engage and space the centrally located portions of the circumferential shell portions of all of said plurality of resilient bushings, a continuous one piece band extending around the circumferential portions of all of said bushings and adjustable means extending through said circumferential band and contacting said central spacer to increase the contact between said band and said bushings to seat said bushings in said central spacer.

2. A resilient drive coupling comprising a plurality of separate resilient bushings each including a central core and a spaced circumferential shell joined by a body of resilient material, a central spacer adapted to engage and space the centrally located portions of the adjacent circumferential shell portions of said bushings and a continuous band extending around the outer circumferential portion of all of said bushings, a plurality of adjustable stud members extending through said band and engaging said central spacer to increase the contact between said band and said bushings to seat said bushings in said central spacer.

3. A resilient drive coupling comprising a plurality of separate resilient bushings each including a central core and a spaced circumferential shell joined by a body of resilient material, a central spacer adapted to engage and space the centrally located portions of the circumferential shell portion of said bushings and a continuous band extending around the circumferential portions of all of said bushings, a plurality of wedge members engaging said band, one of said wedge members being located between each adjacent air of resilient bushings, and an adjustable stud member extending through each of said wedge members and said band and connected with said central spacer.

4. A resilient drive coupling comprising a plurality of separate resilient bushings each including a central core and a spaced circumferential shell joined by a body of resilient material, a central spacer adapted to engage and space the centrally located portions of the circumferential shell portion of said bushings and a continuous band extending around the circumferential portions of all of said bushings, a plurality of adjustable stud members extending through said band and through a hole drilled in the contacting circumferential shell portion of each pair of said resilient bushings and engaging said central spacer to increase the contact between said band and said bushings and to seat said bushings in said central spacer.

5. A resilient drive coupling comprising a plurality of separate resilient bushings each including a central core and a spaced circumferential shell joined by a body of resilient material, a central spacer adapted to engage and space the centrally located portions of the circumferential shell portion of said bushings and a continuous band extending around the circumferential portions of all of said bushings, a plurality of wedge members engaging said band, one of said wedge members being located between each adjacent pair of resilient bushings, an adjustable stud member extending through each of said wedge members and through a hole drilled in the contacting circumferential shell portions of each pair of said resilient bushings and said band and connected with said central spacer to increase the contact between said band and said bushings and to seat said bushings in said central spacer.

6. A connector unit for a resilient power-transmitting coupling and comprising a central spacer, a circumferential one piece band, a plurality of resilient bushings disposed between said spacer and said band, and clamping means connected between said central spacer and said band to exert a clamping pressure on said resilient bushings.

7. A connector unit for a resilient power-transmitting coupling and comprising a central spacer, a circumferential one piece band, and a plurality of resilient bushings disposed between said spacer and said band, and adjustable means connected with said band and said spacer for tightening the engagement of said band and said bushings.

8. A connector unit for a resilient power-transmitting coupling and comprising a central spacer, a circumferential one piece band, and a plurality of resilient bushings disposed between said spacer and said band, and adjustable means extending through said circumferential band and contacting said central spacer for drawing said band and said spacer toward each other for increasing the engagement of said band and said spacer on said resilient bushings.

9. A connector unit for a resilient power-transmitting coupling and comprising a central spacer, a circumferential band, and a plurality of resilient bushings disposed between said spacer and said band, and a plurality of threaded studs extending through said band at a plurality of spaced points and having a threaded engagement with said central spacer for clamping said bushings between said central spacer and said band.

10. A connector unit for a resilient power-transmitting coupling and comprising a central spacer, a circumferential band, and a plurality of resilient bushings disposed between said spacer and said band, and a plurality of wedge members bearing one each on said circumferential band at points between adjacent resilient bushings, and a plurality of threaded studs extending through said wedge members and said band at a plurality of spaced points and having a threaded engagement with said central spacer for adjustably increasing the pressures engaging said bushings between said central spacer and said band.

11. A connector unit for a resilient power-transmitting coupling and comprising a central spacer, a circumferential band, and a plurality of resilient bushings disposed between said spacer and said band, and means extending through a portion of the contacting circumferential edge portions of said resilient bushings for drawing said band and said spacer toward each other to increase the engagement of said band and said spacer on said resilient bushings.

12. A connector unit for a resilient power-transmitting coupling and comprising a central spacer, a circumferential band, and a plurality of resilient bushings disposed between said spacer and said band, and a plurality of threaded studs extending through a portion of the contacting circumferential edge portions of said resilient bushings and through said band at a plurality of spaced points and having a threaded engagement with said central spacer for adjustably increasing the pressures engaging said bushings between said central spacer and said band.

13. A connector unit for a resilient power-transmitting coupling and comprising a central spacer, a circumferential band, and a plurality of resilient bushings disposed between said spacer and said band, and a plurality of wedge members bearing one each on said circumfehential band at points between adjacent resilient bushings, a plurality of threaded studs extending one each through one of said plurality of wedge members and through a portion of the contacting circumferential edge portions of a pair of said resilient bushings and through said band at a plurality of spaced points and having a threaded engagement with said central spacer for adjustably controlling the pressures exerted on said bushings between said central spacers and said circumferential band.

FREDERICK M. GUY.

REFERENCES CITED

The following references are of record in the file of this patent:

UNITED STATES PATENTS

| Number | Name | Date |
| --- | --- | --- |
| 2,153,466 | Hardy | Apr. 4, 1939 |